United States Patent [19]

Anderson et al.

[11] 4,413,418  
[45] Nov. 8, 1983

[54] MEASURING APPARATUS

[75] Inventors: Wilbur F. Anderson, Nineveh; Jon K. Griffith, Seymour, both of Ind.

[73] Assignee: Cummins Engine Company, Inc., Columbus, Ind.

[21] Appl. No.: 365,403

[22] Filed: Apr. 5, 1982

[51] Int. Cl.$^3$ .............................................. G01B 5/00
[52] U.S. Cl. ................................ 33/174 L; 33/147 R; 33/174 Q
[58] Field of Search ............. 33/174 R, 174 Q, 174 L, 33/199 R, 172 R, 172 E, 147 R, 169 R, 179.5

[56] References Cited

U.S. PATENT DOCUMENTS

| | | | |
|---|---|---|---|
| 2,256,527 | 9/1941 | Ring | 33/181 |
| 2,593,986 | 4/1952 | Comstock | 33/174 L |
| 2,770,050 | 11/1956 | Johnson | 33/199 |
| 2,938,273 | 5/1960 | Johnson | 33/174 L |
| 3,011,780 | 12/1961 | Hanisko | 33/174 L X |
| 3,708,885 | 1/1973 | Christ | 33/174 L |
| 4,070,762 | 1/1978 | Siddall | 33/174 L X |
| 4,135,306 | 1/1979 | Hannon | 33/174 L X |

*Primary Examiner*—Harry N. Haroian
*Attorney, Agent, or Firm*—Neuman, Williams, Anderson & Olson

[57] ABSTRACT

An apparatus is provided for measuring the axial and radial runout of a peripheral groove formed in a pulley. The apparatus includes a base from which an upright rotating spindle projects. The spindle removably accommodates the pulley. A frame is adjustably mounted on the base and a carriage is disposed on the frame for independent adjustment relative thereto in substantially axial and radial directions with respect to the spindle axis. A carrier is mounted on the carriage for independent movement to selected positions relative thereto. A plurality of relatively spaced detector elements are mounted on the carrier. When the carrier is in a selected position, one detector element is disposed in close proximity to the pulley periphery. Each detector element is independently adjustable relative to the carrier in a substantially axial direction relative to the spindle. Means are provided which coact with the frame and carriage to position a portion of a selected detector element into aligned engagement with the pulley groove. The carrier and carriage are responsive as a unit to the substantially radial deflection of the detector element engaging the pulley groove. Fixedly mounted gauge means are provided for measuring the axial and radial deflection of the groove-engaging detector element upon rotation of the spindle.

11 Claims, 3 Drawing Figures

MEASURING APPARATUS

BACKGROUND OF THE INVENTION

Accurately measuring the axial and radial, sometimes referred to as lateral, runout of a groove formed in the periphery of a pulley is of importance in significantly increasing the wear-life of either or both, the belt and pulleys utilized in a belt-pulley assembly.

Heretofore, various apparatus have been provided for this purpose; however, because of certain inherent design characteristics they have been beset with one or more of the following shortcomings: (a) the apparatus was incapable of simultaneously measuring axial and radial runout; (b) it was incapable of accommodating pulleys or the like which varied in size and shape over a wide range; (c) it was highly susceptible to malfunction; (d) it required an inordinate amount of service and maintenance; (e) it required a substantial amount of disassembly and assembly in order to substitute components for measuring various size pulley grooves; (f) it was incapable of accurately measuring the runout of the side surfaces forming the groove.

SUMMARY OF THE INVENTION

Thus, it is an object of the invention to provide a measuring apparatus which readily avoids all of the aforenoted shortcomings associated with prior equipment of this general type.

It is a further object to provide a measuring apparatus which is simple to operate and yet, is capable of accurately measuring simultaneously the axial and radial runout of a pulley groove.

It is a still further object to provide an apparatus having a plurality of detector elements which readily engage the side walls of the pulley grooves thereby enabling an actual runout reading of the groove itself rather than the outside diameter of the pulley or the bottom of the groove formed therein.

Further and additional objects will appear from the description, accompanying drawings, and appended claims.

In accordance with one embodiment of the invention, an apparatus is provided for measuring the axial and radial runout of a peripheral groove formed in a pulley or the like. The apparatus includes a base from which a rotatable pulley-accommodating spindle projects. A frame is mounted on the base for adjustment relative thereto in a direction substantially radial with respect to the rotary axis of the spindle. A carriage is mounted on the frame for independent adjustment relative thereto in substantially axial and radial directions with respect to the spindle axis. Mounted on the carriage is a carrier which is independently adjustable to various selected positions. A plurality of relatively spaced detector elements are adjustably mounted on the carrier. When the carrier is in a selected position, one detector element is disposed in close proximity to the pulley periphery. Means are provided which coact with the frame and carriage so as to position a portion of a selected detector element into aligned engagement with the side surfaces defining the peripheral groove of the pulley. The carrier and carriage are responsive as a unit to the substantially radial deflection of the groove-engaging detector element when the pulley is rotating about the spindle axis. A first measuring gauge is provided which is responsive to the substantially radial deflection of the groove-engaging detector element during rotation of the pulley. A second measuring gauge is provided which is responsive to the substantially axial deflection of the groove-engaging detector element during rotation of the pulley.

DESCRIPTION

For a more complete understanding of the invention reference should be made to the drawings wherein.

Figure 1:
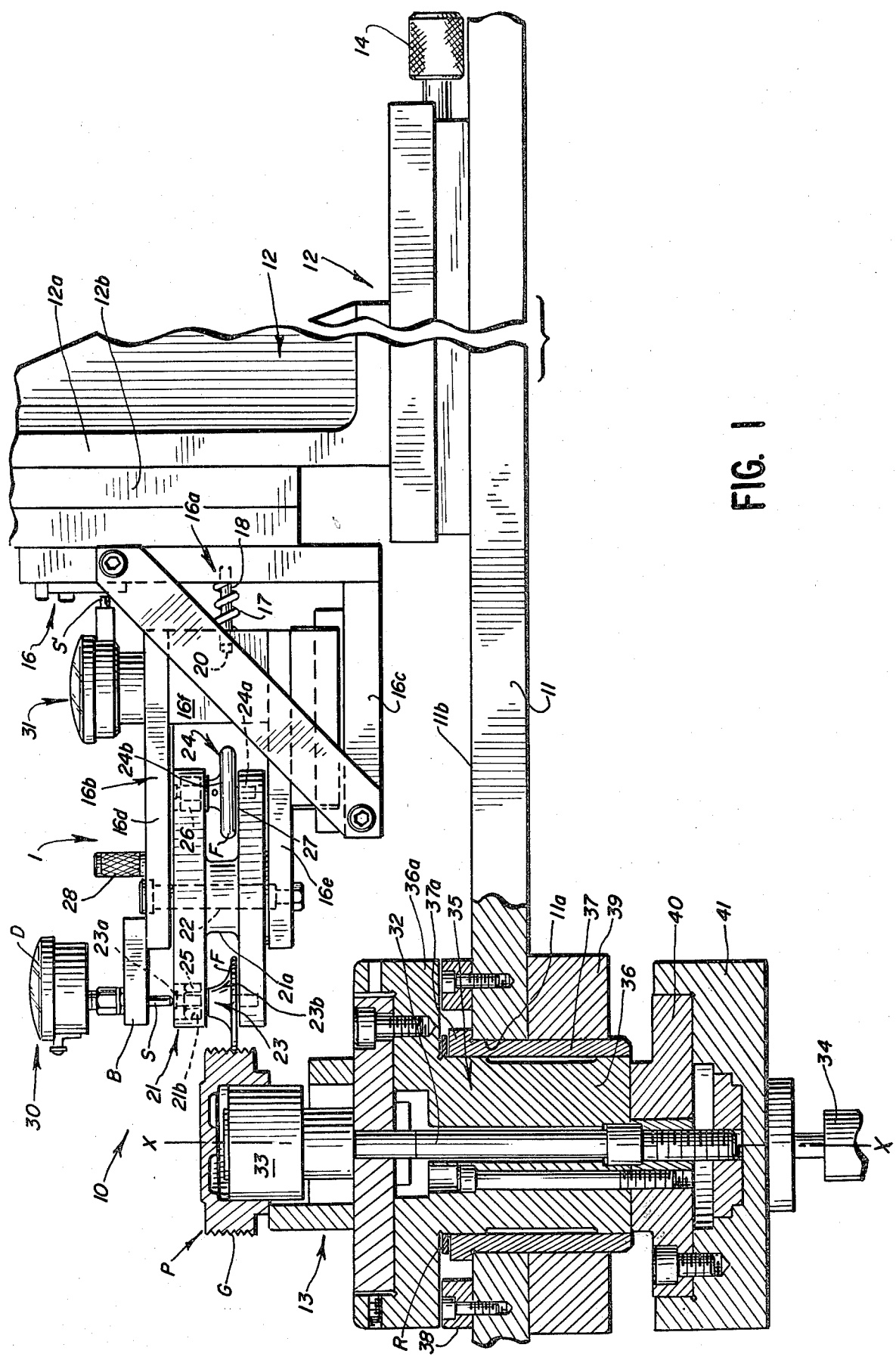
FIG. 1 is a fragmentary side elevational view of one form of the improved measuring apparatus with various components comprising the spindle shown in substantially vertical section and with one of the detector elements engaging a groove formed in the periphery of a pulley mounted on the spindle.

Referring now to the drawings, one form of the improved measuring apparatus 10 is shown which is adapted to simultaneously measure the axial and radial runout of a groove G formed in the periphery of a pulley P, the latter being of a type utilized in a conventional V belt-pulley assembly. The apparatus 10, as shown, includes a horizontally disposed supporting base 11 on which is slidably mounted a frame or block 12. Rotatably mounted on the supporting base 11 and projecting vertically upwardly therefrom is a spindle assembly 13 on which is removably accommodated the pulley P.

The frame 12 is adjustable relative to base 11 in a substantially radial direction with respect to the spindle axis x—x by a manually actuated feed screw 14. The frame includes an upwardly extending section 12a which is provided with a vertical guideway 12b. Mounted on section 12a and disposed adjacent to the guideway is a manually adjustable pinion 15 which has a suitable handle H affixed to the upper end thereof.

Mounted on guideway 12b for vertical movement is a carriage 16 which includes an inner section 16a and an outer section 16b. The inner section 16a is in slidable engagement with the guideway 12b and is movable therealong upon turning the pinion 15. Inner section 16a is provided with a horizontally extending platform 16c on which the outer section 16b is mounted for limited sliding adjustment. The outer section 16b is biased by a light spring 17 to normally assume a rest position I as seen in FIG. 1. The spring encompasses a guide pin 18 which extends from the inner section 16b. The free end of pin 18 is slidably disposed within a suitably aligned hole 20 formed in outer section 16b.

Outer section 16b, as seen in FIG. 1, includes a pair of upper and lower platelike members 16d, 16e which are in vertically spaced relation and extend horizontally from a center member 16f. The aforementioned hole 20 is preferably formed in the surface of center member 16f, which is adjacent inner section 16a of carriage 16.

Rotatably mounted on the carriage outer section 16b and disposed between the upper and lower platelike members 16d, 16e is a carrier 21. The carrier has an annular configuration and is connected to the platelike members by a vertically extending center pin 22. As seen in FIG. 1, carrier 21 is provided with a wide circumferential groove 21a. Disposed within the carrier groove are a plurality of symmetrically arranged detector elements 23, 24 (only two being shown). Each element is provided with a central vertically extending pin 23a, 24a which projects upwardly and downwardly from a flanged annular center portion 23b, 24b. The upper and lower ends of center pin 23a, 24a are slidable endwise in suitable bearings 25, 26 fixedly mounted within aligned opening 2b formed adjacent the outer periphery of the carrier. Suitable wave or spring washers 27 are disposed between the detector element center portion 23b, 24b and the upper and lower surfaces of the circumferential groove 21a of the carrier. The axial dimension of the center portion of each detector element is substantially less than the width of the groove 21a; thus, the wave washers 27 coact with one another to cause each detector element to normally assume a free-floating position between the upper and lower groove surfaces. Thus, each detector element is free to move vertically from its centered position in response to any axial variation in the pulley groove as the pulley rotates about the spindle axis as will be described more fully hereinafter.

Figure 2:
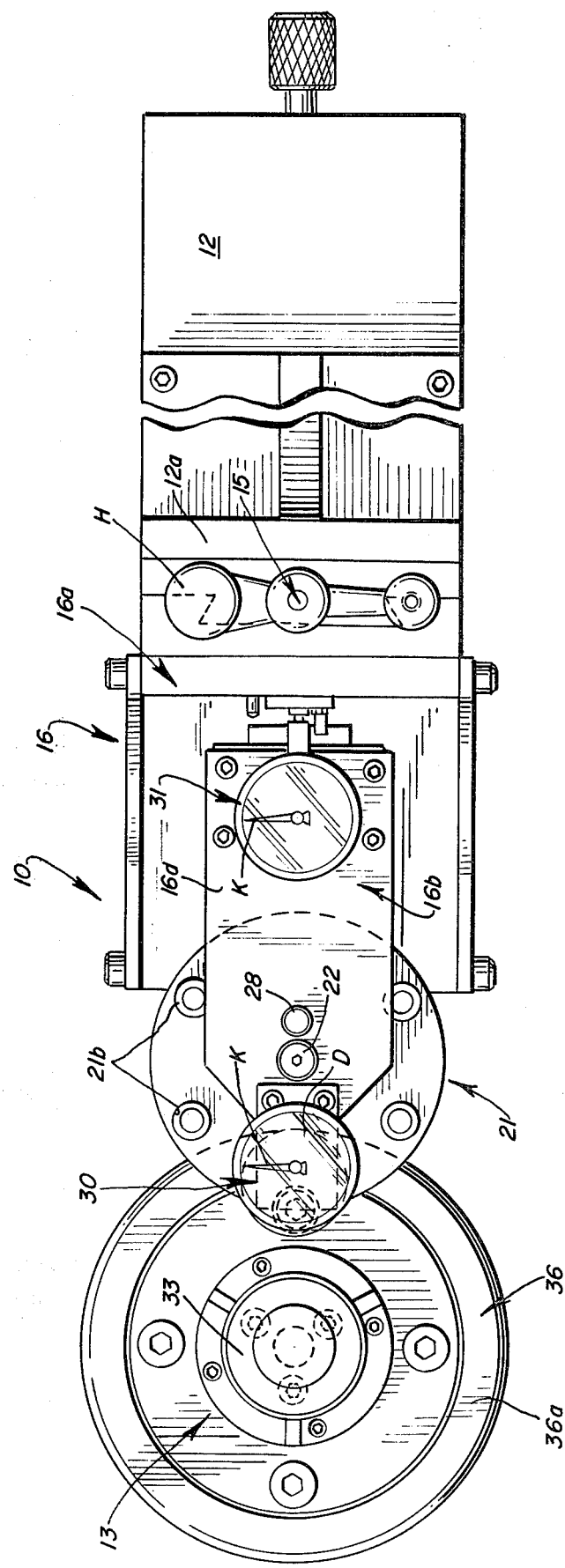
FIG. 2 is a fragmentary top plan view of the apparatus of FIG. 1.
Figure 3:
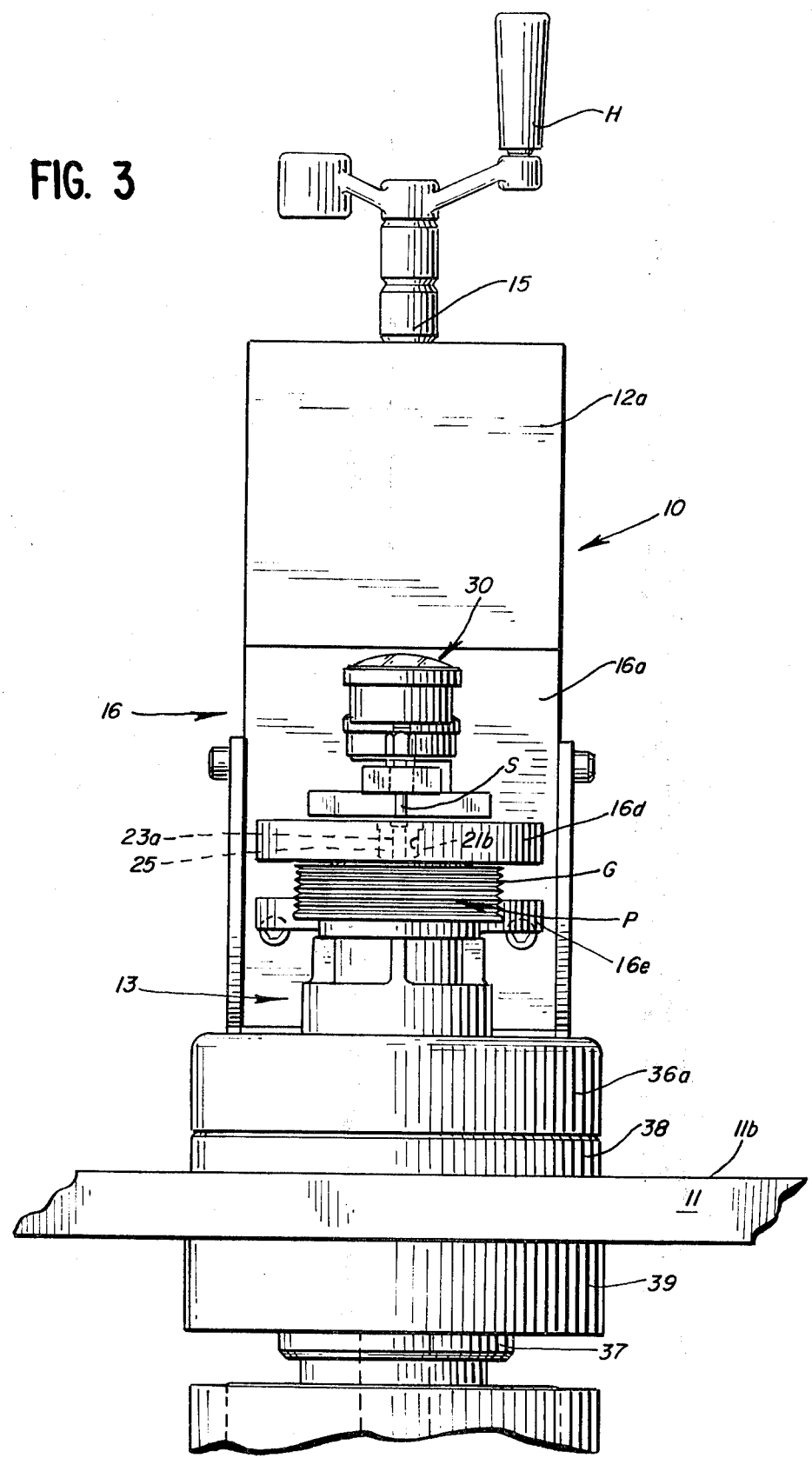
FIG. 3 is a fragmentary left end elevational view of the apparatus of FIG. 1.

As will be noted in FIG. 2 the carrier is provided with a plurality of symmetrically arranged openings 21b for accommodating a like number of detector elements. The carrier is adapted to be manually adjusted to various selected positions of adjustment with respect to the carriage platelike members 16d, 16e whereby one opening 21b and a corresponding detector element are disposed in close proximity to the peripheral groove of the spindle-mounted pulley. The carrier is retained in a selected position by an axially adjusted lock pin 28 which is disposed on the upper plate-like member 16d of the carriage. The lock pin is biased in a direction towards the carrier and the inner end of the pin will extend in a suitably aligned aperture formed in the carrier. There is an aperture formed in the carrier for each selected position of the carrier.

Mounted on the carriage is a pair of relatively spaced gauges 30, 31. Gauge 30 is secured to the upper platelike member 16d of the carriage 16 by a bracket B. Gauge 30 is provided with a dial D, pointer K, and a depending vertically adjustable stem S. The distal end of the stem S engages the upper end of the center pin 23a, 24a of the detector element 23, 24 which is vertically aligned with the gauge stem S when the carrier is disposed in a selected position. The stem S is responsive to any axial, or endwise, movement of the detector element center pin and such response is transmitted to the pointer K which measures the movement on the gauge dial D.

Gauge 31 is mounted on the upper platelike member 16d of the carriage outer section 16b and is in close proximity to the inner section 16a. Gauge 31 includes a dial and pointer similar to that embodied in gauge 30. Instead of the depending stem of gauge 30, gauge 31 is provided with a laterally extending stem S'. The distal end of stem S' is in contact with a surface of the carriage inner section 16a. Thus, gauge stem S' is responsive to the relative radial movement of the outer section 16b with respect to the inner section 16a and such response is transmitted to the pointer K which measures the movement on the gauge dial D.

As will be noted in FIG. 1, each detector element has the center portion thereof provided with an annular flange F. The thickness of the flange of each detector element varies and corresponds to the size pulley groove to be measured. It is desirable that the outer periphery of the flange engages the tapered side walls forming the pulley groove rather than the base, or bottom, of the groove because it is such groove side walls that are engaged by the belt to be utilized with the pulley.

The spindle assembly 13, as seen in FIG. 1, is disposed within a suitable opening 11a formed in the supporting base 11 and includes a hollow shaft 32 the upper end of which is provided with a conventional collet 33. The lower end of shaft 32 is connected to a suitable air cylinder 34 which is adapted to control the expansion and contraction of the collet. The pulley to be measured is placed over the collet when the latter is in a contracted state.

Shaft 32 is mounted within a suitable bearing unit 35 which includes a cylindrical adaptor 36 having a shouldered upper end 36a. The adaptor in turn is rotatably mounted within a bushing 37 which is press-fit into the base opening 11a. The upper end 37a of the bushing is shouldered and projects beyond the exposed surface 11b of the base 11. Secured to base surface 11b and in spaced, encompassing relation with respect to the shouldered end of the bushing 37 is a spacer ring 38. Ring 38 is adapted to be slidably engaged by the underside of the outer periphery of the shouldered upper end 36a of the adaptor 36. A roller bearing R or the like may be interposed the shouldered end 37a of the bushing 37 and the underside of the shouldered upper end 36a of the adaptor. As seen in FIG. 1, the roller bearing R is disposed inwardly of ring 38. A guide ring 39 is secured to the underside of base 11 and supportingly engages the depending portion of bushing 37.

Secured to the lower end of the adaptor 36 by suitable means is a flanged disc-like plate 40 which, in turn, is secured to an actuator member 41. The adaptor 36, actuator member 41, shaft 32, and collet 33 are adapted to be either manually rotated or power driven as a unit about axis x—x.

Suitable controls and connecting devices, not shown, are utilized for connecting the shaft air cylinder 34 to the plant air supply line normally available in the plant, factory, or laboratory facility in which the apparatus would normally be located.

While conventional dial gauges 30, 31 have been illustrated and described herein, it is not intended to limit the apparatus to such structure. Digital reading or printout devices may be readily substituted therefor and such devices could be located on a suitable instrument panel.

Thus, a simple, yet reliable, measuring apparatus has been provided which is capable of simultaneously measuring axial and radial runout of a peripheral groove formed in a pulley or the like. Furthermore, the apparatus may be utilized to measure grooves varying in size and shape over a wide range without requiring substantial, or even partial, disassembly of the apparatus.

We claim:

1. An apparatus for measuring the axial and radial runout of a groove formed in the periphery of a pulley, said apparatus comprising a base; a spindle mounted on said base and accommodating the pulley; a frame adjustably mounted on the base; a carriage mounted on said frame and adjustable independently thereof substantially axially and radially of the spindle axis; a carrier mounted on said carriage and adjustable independently thereof to a plurality of selected positions; a plurality of relatively spaced detector elements adjustably mounted on said carrier whereby a detector element is in close proximity to the pulley groove when said carrier is in each selected position; adjustable means coacting with said carriage and frame for positioning the detector element at the selected position whereby a portion of the detector element is in aligned engagement with side surfaces defining the pulley groove; and gauge means for simultaneously measuring axial and radial deflection of the groove-engaging detector element upon rotation of the spindle.

2. The apparatus of claim 1 wherein the carrier is rotatably mounted on said carriage about an axis substantially parallel to the spindle axis.

3. The apparatus of claim 1 wherein the gauge means includes a first gauge mounted on said carrier and responsive to the movement of the groove-engaging detector element in a direction substantially axial of the spindle, and a second gauge spaced from the first gauge and responsive to the movement of the groove-engaging detector element in a direction substantially radial of the spindle axis; said gauges being responsive only when the spindle is rotating.

4. The apparatus of claim 3 wherein said carrier and at least a section of said carriage are responsive as a unit to the substantially radial movement of the groove-engaging detector element.

5. The apparatus of claim 1 wherein the base includes manually actuated means for moving as a unit said frame, said carriage, said carrier, and said detector elements in a direction substantially radially of said spindle axis.

6. The apparatus of claim 1 wherein each detector element includes a peripheral flange whereby when the detector element and the carrier are in a selected position, the flange is adapted to engage at least the side surfaces of the pulley groove.

7. The apparatus of claim 6 wherein each detector element is mounted on said carrier to permit self-centering of the flange of a selected detector element between the side surfaces of the pulley groove.

8. The apparatus of claim 1 wherein the carriage includes means for locking said carrier with respect to the carriage in any of the selected positions.

9. The apparatus of claim 6 wherein the flange of each detector element has a different thickness.

10. The apparatus of claim 1 wherein the carriage includes a first section on which the carrier is mounted and a second section, said first section being independently adjustable relative to said second section in response to the substantially radial deflection of the groove-engaging detector element upon rotation of the spindle; the gauge means includes a gauge for measuring the independent adjustment of said carriage first section relative to said second section.

11. The apparatus of claim 10 wherein the gauge means includes a second gauge for measuring the adjustment of a groove-engaging detector element relative to the carrier in a direction substantially axial of the spindle during rotation of the latter.

* * * * *